United States Patent

[11] 3,606,988

| [72] | Inventors | Klaus Walz<br>Leverkusen-Wiesdorf;<br>Mathieu Quaedvlieg, Opladen; Manfred<br>Baecker, Blecher, all of Germany |
|------|-----------|---|
| [21] | Appl. No  | 748,647 |
| [22] | Filed     | July 30, 1968 |
| [45] | Patented  | Sept. 21, 1971 |
| [73] | Assignee  | Farbenfabriken Bayer Aktiengesellschaft<br>Leverkusen, Germany |
| [32] | Priority  | Apr. 8, 1967 |
| [33] |           | Germany |
| [31] |           | F 53172 |

[54] PROCESS FOR DYEING NITROGEN-CONTAINING FIBRE MATERIALS
11 Claims, No Drawings

[52] U.S. Cl. .................................................. 8/54,
8/172, 8/173, 260/51.5
[51] Int. Cl. .................................................. D06p 3/14
[50] Field of Search ............................ 252/152;
8/43, 87, 54, 172, 173

[56] References Cited
UNITED STATES PATENTS
3,401,004   9/1968   Krumme et al. ..............   8/172 X
OTHER REFERENCES
L. F. Fieser et al., Advanced Organic Chemistry, Reinhold Publishing Corp. N Y 3rd Printing, 1963, pp. 463, 464 and 843 Copy in 8-172 Lit.

Primary Examiner—George F. Lesmes
Assistant Examiner—T. J. Herbert, Jr.
Attorney—Plumley, Tyner & Sandt ABSTRACT: Process for dyeing nitrogen-containing fiber materials, e.g., wool, with acid dyestuffs or metal complex dyestuffs wherein the dyeing process is carried out in the presence of, as a dyeing auxiliary, the reaction product of (1) an alkylene oxide and (2) the condensation product of (a) formaldehyde, (b) a phenolic compound, and (c) an amine containing at least two —NH groups; or the quaternization or esterification products of said reaction product (2).

PROCESS FOR DYEING NITROGEN-CONTAINING FIBRE MATERIALS

The present invention relates to a process for dyeing nitrogen-containing fiber materials with acidic dyestuffs or metal complex dyestuffs. More particularly it concerns a process wherein the dyeing is carried out in the presence of reaction products of alkylene oxides on condensation products which carry reactive hydrogen atoms and have been prepared from formaldehyde or formaldehyde-yielding compounds, from phenolic compounds containing in the nucleus at least two hydrogen atoms which are reactive towards formaldehyde, and from amines containing at least two NH-groups which are reactive towards formaldehyde, or the quaternisation products and/or esterification products of these reaction products.

To produce the reaction products to be used according to the invention, the condensation products containing reactive hydrogen atoms described below were reacted with alkylene oxides, such as ethylene oxide or glycide, or mixtures of ethylene oxide with higher alkylene oxides, such as propylene oxide, butylene oxide or styrene oxide. The amount of alkylene oxides, referred to the amount of condensation product, was varied within wide limits; preferably, 10-200 moles ethylene oxide were reacted on 1 mole of the phenolic compound on which the condensation products are based. The reaction was carried out in the usual manner at 100-140° C. in the presence of basic catalysts, such as sodium or potassium hydroxide or sodium methylate.

The condensation products containing reactive hydrogen atoms, on which the reaction products (polyalkylene glycol ethers) to be used according to the invention are based, can be prepared in various ways; for example, by heating the three components-formaldehyde or formaldehyde-yielding compounds, phenolic compounds containing in the nucleus at least two hydrogen atoms which are reactive towards formaldehyde, and amines containing at least two NH-groups which are reactive towards formaldehyde-expediently in a molar ratio of 1-4:1:0.5-3 at 60 to 100° C. for about 3 to 5 hours; or by heating the phenolic compounds possibly in the form of the alkyl ethers or polyglycol ethers, first with the two other components and subsequently again with formaldehyde or formaldehyde-yielding compounds and with a compound containing only one NH-group which is reactive towards formaldehyde, such as ethylamine, butylamine, 2-ethylhexylamine, tetradecylamine, octadecylamine, octadecenylamine, methylstearylamine, cyclohexylamine, aniline, dodecylaniline, benzylamine and lauric acid amide.

Suitable formaldehyde-yielding agents are primarily paraformaldehyde, trioxymethylene, formaldehyde dimethylacetal and hexamethylene-tetramine.

Examples of phenolic compounds on which the condensation products are based are phenol, cresols, ethylphenols, isopropylphenols, p-tert.-butylphenol, o-cyclohexylphenol, iso-nonylphenol, guaiacol, hydroxyacetophenone, o-, m- or p-chlorophenol, salicylic acid, p-dimethylaminophenol, p-acetamidophenol, α-naphthol, β-naphthol, alkylnaphthols, tetrahydronaphthol, 4,4'-dihydroxydiphenyl, 4,4'-dihydroxydiphenyl-methane, hydroquinone, resorcinol and pyrocatechol as well as the ethers which can be obtained therefrom, for example, by the reaction with alkyl halides, alkyl sulfates, or alkylene oxides.

Examples of amines containing at least two NH-groups which are reactive towards formaldehyde are ethylene-diamine, N,N'-dimethyl-ethylene-diamine, N-(2-hydroxyethyl)-ethylene-diamine, propylene-diamine, N-methyl-propylene-diamine, N,N'-dimethyl-propylene-diamine, N-butyl-propylene-diamine, N-tetradecyl-propylene-diamine, 1,4-butylene-diamine, hexamethylene-diamine, 2,2,4-trimethyl-hexamethylene-diamine-(1,6), bis-(3aminopropyl)-ether, bis-(3-aminopropyl)-methylamine, bis-(3-aminopropyl)-sulphide, ε-aminocaproic acid amide, N,N-bis-(2-carbamoylethyl)-methylamine, 1,4-diamino-cyclohexane, phenylene-diamine, naphthylene-diamine, 1,4-bis-(aminomethyl)-benzene, 1,3-bis-(aminomethyl)-4,6-dimethyl-benzene and piperazine.

For the quaternisation of the reaction products to be used according to the invention, there were used the customary quaternising agents, such as dimethyl sulfate, diethyl sulfate, ethyl iodide, p-toluene-sulphonic acid methyl ester, chloroacetamide or benzyl chloride. For esterification, polybasic acids were chiefly used, such as sulfuric acid, phosphoric acid and maleic acid, or their derivatives, such as chlorosulphonic acid, amidosulphonic acid, phosphorus oxychloride and maleic acid anhydride.

Nitrogen-containing fiber materials which are suitable for the process according to the invention are all fiber materials which can be dyed with acidic dyestuffs or metal complex dyestuffs, in particular, wool, silk, synthetic polyamides, basic-modified polyacrylonitriles, and their mixtures with one another. The nitrogen-containing fiber materials may be present in admixture with other fiber materials, such as natural or regenerated cellulose, cellulose triacetate, polyacrylonitrile, polyurethanes or polyesters from, for example, terephthalic acid and ethylene glycol or 1,4-bis-hydroxymethyl-cyclohexane.

The acidic dyestuffs and metal complex dyestuffs to be used for the dyeing process according to the invention may also be reactive dyestuffs and can belong to a great variety of dyestuff classes, for example, to the classes of azo, anthraquinone or triphenyl-methane dyestuffs.

The necessary amounts of polyalkylene glycol ethers or their quaternisation and/or esterification products to be used according to the invention can easily be established by preliminary experiments. In general, 0.2-3 percent of these compounds, referred to the weight of the material to be dyed, are used if the compounds serve as levelling agents. If they serve as stripping agents, amounts of about 2-5 percent, referred to the weight of the material to be dyed, have proved satisfactory.

The dyeing of the nitrogen-containing fiber materials with the dyestuffs concerned, in the presence of the polyalkylene glycol ethers to be used according to the invention or their quaternisation and/or esterification products, is expediently carried out by introducing the material to be dyed into an aqueous bath which has been heated to about 40-60° C. and contains the dyestuff, the alkoxylation products to be used according to the invention, added salts, such as sodium sulfate, and acids, such as acetic acid, formic acid or sulfuric acid, subsequently raising the temperature of the dyebath to approximately 100° C. in the course of about 30 minutes, and then keeping the dyebath at this temperature until it is substantially exhausted. However, the dyestuff may also be subsequently added to the dyebath, for example, when the temperature of the bath has risen to about 60° C.

With the aid of the process according to the invention it is possible to dye nitrogen-containing fiber materials which may be present, for example, in the form of cable sheathings, flocks, combed materials, filaments, yarns, fabrics, knitted fabrics or fleeces, with outstanding levelness. The outstanding levelness of the dyeings obtained is due to the fact that the alkoxylation products to be used according to the invention have the advantageous property, in addition to their excellent levelling power, of not to producing or stabilizing foam in the dyebaths so that their levelling power becomes fully effective. The unevenness of color which is due to the irregular immersion, especially of light material, in foaming dyebaths, is obviated. Moreover, the material to be dyed is subjected to substantially less mechanical stress, since, for example, the sticking together and the entanglement of yarns which occurs in foaming dyebaths does not arise. It is also easier to work with nonfoaming dyebaths, as there occur no obstructions of the flow when dyeing on skein, cheese or beam dyeing apparatus.

The parts given in the following Examples are parts by weight; the stated dyestuff numbers refer to Color Index, Volume 3, and Edition.

Example 1

A carded woolen fabric of pure wool is treated in a winch vat in a liquor ratio of 1:40 with a liquor containing, per litre, 0.04 g. of the 2:1 chromium complex of the azo dyestuff 2-hydroxy-aniline-4-dimethyl-sulphonamide → 1-phenyl-3-methyl-5-pyrazolone 1-ethylsulponyl-amino-7-hydroxy-naphthalene 0.02 g. of the 2:1 chromium complex of the azo dyestuff 2-amino-4-ethylsulphonyl-phenol → 1-ethylsulponyl-amino-7-hydroxy-naphthalene 2.5 g. of calcined sodium sulfate 0.5 g. of glacial acetic acid and 0.25 g. of the alkoxylation product described below.

The dyebath is heated from 50° to 100° C. within 30 minutes and subsequently kept at this temperature for 30 minutes. 0.02 g. of the 2:1 chromium complex of the azo dyestuff anthranilic acid → 1-phenyl-3-methyl-pyrazolone are then added to the boiling dyebath. After further dyeing at boiling temperature for 30 minutes, the dyeing process is completed. A brown dyeing of faultless levelness is obtained.

The alkoxylation product used above was prepared as follows:

108 parts p-cresol, 67 parts hexamethylene-diamine and 45 parts paraformaldehyde were heated with stirring at 90° C. for 3 hours. The reaction water was then distilled off in a vacuum. 26.6 parts of the condensation product so obtained were reacted with 440 parts ethylene oxide at 120° C. with the addition of 0.2 parts potassium hydroxide.

Example 2

The process is carried out as described in example 1 but with the use of a dyebath containing, instead of the alkoxylation product there used, 0.25 g of one of the alkoxylation products described below. The resulting brown dyeings are characterized by outstanding levelness. The alkoxylation products used were prepared as follows:

a. 26.6 parts of the condensation product obtained in example 1 were reacted with 352 parts ethylene oxide in the presence of 0.2 parts potassium hydroxide at 120° C. and the mixture was subsequently stirred with 9.7 parts amidosulphonic acid at 90° C. for 5 hours.

b. 54 parts p-cresol, 22.5 parts ethylene-diamine and 22.5 parts paraformaldehyde were condensed under the reaction conditions indicated in example 1 ; 19.2 parts of the condensation product so obtained were reacted with 396 parts ethylene oxide in the presence of 0.2 parts potassium hydroxide at 120–130° C c. 54 parts p-cresol, 60 parts 1,6-diamino-2,2,4-trimethylhexane and 22.5 parts paraformaldehyde were condensed under the reaction conditions indicated in example 1; 29 parts of the condensation product so obtained were reacted with 440 parts ethylene oxide in the presence of 0.3 parts potassium hydroxide at 120° C.

d. 108 parts o-cresol, 87 parts hexamethylene-diamine and 45 parts paraformaldehyde were condensed under the reaction conditions indicated in example 1; 26.5 parts of the condensation produce so obtained were reacted with 352 parts ethylene oxide in the presence of 0.3 parts potassium hydroxide at 120° C.

e. 54 parts p-cresol, 43.5 parts hexahydro-1,4-phenylene-diamine and 22.5 parts paraformaldehyde were condensed under the reaction conditions indicated in example 1; 49 parts of the condensation product so obtained were dissolved in 100 parts xylene and reacted with 790 parts ethylene oxide in the presence of 0.5 parts potassium hydroxide at 120° C. The xylene was subsequently distilled off in a vacuum.

f. 110 parts nonylphenol, 58 parts hexamethylene-diamine and 30 parts paraformaldehyde were reacted at 90° C. for 5 hours. 36 parts of the condensation product was so obtained were reacted with 396 parts ethylene oxide in the presence of 0.4 parts potassium hydroxide at 120° C.

g. 74.5 parts of the condensation product from p-cresol, hexamethylene-diamine and paraformaldehyde described in example 1 were mixed at 90° C with 25 parts 2-ethylhexylamine and 6 parts paraformaldehyde The condensation reaction was completed by heating the reaction mixture at 90° C. for 5 hours. The reaction water formed was subsequently distilled off in a vacuum After the addition of 1 part potassium hydroxide, the condensation product was reacted with 1,570 parts ethylene oxide at 120°C.

Example 3

Woolen worsted yarn wound on cheeses is treated in a liquor ratio of 1: 15 at 50° C. for 5 to 10 minutes with a liquor containing, per litre, 2 g. of calcined sodium sulfate 1 g. of glacial acetic acid 0.66 g of the alkoxylation product described in example 2(e).

The bath is subsequently heated to 100° C within about 15 minutes. At this temperature, there are added 0.14 g. of the 2:1 chromium complex of the azo dyestuff 2-amino-4-ethylsulphonyl-phenol → 1-ethylsulphonyl-amino-7-hydroxynaphthalene.

After dyeing at 100° C. for 60 minutes, the dyeing process is completed. A grey dyeing of excellent levelness is obtained.

Example 4

Woolen knitting yarn is dyed in a liquor ratio of 1 30 in a one-pole yarn-dyeing apparatus in a suspension system. The dyebath used contains, per litre, 1.67 g. of calcined sodium sulfate 0.7 g. of glacial acetic acid 0.27 g. of the alkoxylation product described below 0.33 g. of the dyestuff C.I. No. 18,035.

The dyebath is heated from 50 to 100° C within 30 minutes and subsequently kept at this temperature for 30 minutes. 0.042 g. of the dyestuff C.I. No. 61,135 are then added After further dyeing at boiling temperature for 30 minutes, the dyeing process is completed. An extremely level ruby dyeing is obtained.

The alkoxylation product used was prepared as follows
26.6 parts of the condensation product described in example 1 were reacted with 176 parts ethylene oxide in the presence of 0 3 parts potassium hydroxide at 120°C.

An equally level dyeing is obtained when the alkoxylation product described above is replaced with its quaternisation product This quaternisation product was obtained by reacting 203 parts of the alkoxylation product described above with 12.5 parts dimethyl sulfate at 90° C for 5 hours.

Example 5

The process is carried out as described in example 4, but the dyebath contains, instead of the acidic dyestuff there used.

0.33 g. of the dyestuff 2-aminobenzene-sulphonic acid → 1 1 2',3'DICHLOROQUINOXALINE—(6)-carbonyl]-amino-8-hydroxy-3,6-disulfonic acid. A red dyeing of outstanding levelness is obtained.

Example 6

A silk fabric is dyed in a winch vat in a liquor ratio of 1 50 with a dyebath containing, per litre, 2 g. of calcined sodium sulfate 0.4 g. of glacial acetic acid 0.15 g. of the alkoxylation product described in example 2 (f)

0.025 g. of the dyestuff C.I No. 61,135

0.028 g. of the 2:1 chromium complex of the azo dyestuff 2-amino-4-ethylsulphonyl-phenol → 1-ethylsulphonyl-amino-7-hydroxynaphthalene.

The dyebath is heated from 40° to 90–95° C. within 30 minutes and subsequently kept at this temperature for 1 hour. A blue-green dyeing of excellent levelness is obtained.

We claim:

1. In the process of dyeing nitrogen-containing fiber materials with acidic or metal complex dyestuffs in the presence of a dyeing auxiliary, the improvement comprising utilizing a dyeing auxiliary consisting essentially of the reaction product of (1) and alkylene oxide and (2) the condensation product of
   a. formaldehyde or formaldehyde yielding compound;
   b. phenolic compound containing at least two nuclear hydrogen atoms reactive with formaldehyde; and
   c. amine containing at least two NH-groups reactive with formaldehyde;
or the quaternization or esterification products of said reaction product.

2. The process of claim 1 wherein said alkylene oxide is ethylene oxide.

3. The process of claim 1 wherein said dyeing auxiliary is the reaction product of (1) an alkylene oxide and (2) the condensation product of
   a. formaldehyde or formaldehyde yielding compound;
   b. phenolic compound containing at least two nuclear hydrogen atoms reactive with formaldehyde; and
   c. amine containing at least two NH-groups reactive with formaldehyde.

4. The process of claim 1 wherein said dyeing auxiliary is the quaternization product of the reaction product obtained by quaternization with an agent selected from the group consisting of dimethylsulfate, diethylsulfate, ethyl iodide, p-toluenesulfonic acid methyl ester, chloro-acetamide and benzyl chloride.

5. The process of claim 1 wherein said dyeing auxiliary is the esterification product of the reaction product obtained by esterification with an agent selected from the group consisting of sulfuric acid, phosphoric acid, maleic acid, chlorosulfonic acid, amidosulfonic acid, phosphorus oxychloride and maleic acid anhydride.

6. The process of claim 1 wherein the nitrogen containing fiber is selected from the group consisting of wool, silk, synthetic polyamides, basic-modified polyacrylonitriles, and their mixtures with one another.

7. The process of claim 6 wherein the fiber is wool or silk.

8. The process of claim 1 wherein the reactant (2)(a) is formaldehyde, paraformaldehyde, trioxymethylene, formaldehyde dimethyl-acetal and hexamethylene-tetramine.

9. The process of claim 1 wherein the reactant (2)(b) is selected from the group consisting of phenol, cresols, ethylphenols, isopropylphenols, p-tert.-butylphenol, o-cyclohexylphenol, iso-nonylphenol, guaiacol, hydroxyacetophenone, o-, m- or p- chlorophenol, salicyclic acid, p-dimethylaminophenol, p-acetamidophenol, α-naphthol, β-naphthol, alkylnaphthols, tetrahydronaphthol, 4,4'-dihydroxydiphenyl, 4,4'-dihydroxy-diphenyl-methane, hydroquinone, resorcinol, pyrocatechol and the ethers which can be obtained therefrom by the reaction with alkyl halides, alkyl sulfates, or alkylene oxides.

10. The process of claim 1 wherein the reactant (2)(c) is selected from the group consisting of ethylene-diamine, N,N'-dimethyl-ethylene-diamine, N-(2-hydroxyethyl)-ethylene-diamine, propylene-diamine, N-methyl-propylene-diamine, N,N'-dimethyl-propylene-diamine, N-butyl-propylene-diamine, N-tetradecylpropylene-diamine, 1,4-butylene-diamine, hexamethylene-diamine, 2,2,4-trimethyl-hexamethylene-diamine-(1,6), bis-(3-aminopropyl)ether, bis-(3-aminopropyl)-methyl-amine, bis-(3-aminopropyl)-sulfide, ε-aminocaproic acid amide, N,N-bis-(2-carbamoylethyl)-methylamine, 1,4,-diamino-cyclohexane, phenylene-diamine, naphthylene-diamine, 1,4-bis-(aminobethyl)-benzene, 1,3-bis-(aminomethyl)-4,6-dimethyl-benzene and piperazine.

11. The process of claim 1 wherein the molar ratio of the reactants 2(a) : 2(b) : 2(c) is 1–4:1:0.5–3.